United States Patent
Zeng (10) Patent No.: US 12,244,140 B2
(45) Date of Patent: Mar. 4, 2025

(54) POWER SUPPLY MANAGEMENT CIRCUIT AND POWER SUPPLY USING THE SAME

(71) Applicant: Chicony Power Technology Co., Ltd., New Taipei (TW)

(72) Inventor: Yu-Xian Zeng, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 18/227,495

(22) Filed: Jul. 28, 2023

(65) Prior Publication Data

US 2024/0396329 A1   Nov. 28, 2024

(30) Foreign Application Priority Data

May 22, 2023   (TW) .................................. 112118994

(51) Int. Cl.
  *H02J 1/08*   (2006.01)
  *H02M 7/537*   (2006.01)
(52) U.S. Cl.
  CPC .............. *H02J 1/08* (2013.01); *H02M 7/537* (2013.01)
(58) Field of Classification Search
  None
  See application file for complete search history.

(56) References Cited

U.S. PATENT DOCUMENTS

| 4,541,848 A | 9/1985 | Masuda |
| 5,465,030 A | 11/1995 | Smith |

| 2013/0119903 A1* | 5/2013 | Weiss | H02H 7/125 318/400.3 |
| 2013/0264995 A1* | 10/2013 | Lee | B60L 58/12 320/104 |
| 2022/0231537 A1* | 7/2022 | Hirota | H02J 7/16 |
| 2023/0144351 A1* | 5/2023 | Park | H01M 10/4264 320/166 |

FOREIGN PATENT DOCUMENTS

| CN | 101820573 | 9/2010 |
| CN | 202150634 | 2/2012 |
| CN | 102377415 | 3/2012 |

(Continued)

*Primary Examiner* — Alfonso Perez Borroto
*Assistant Examiner* — Esayas G Yeshaw
(74) *Attorney, Agent, or Firm* — Andrew M. Calderon; Calderon Safran & Wright P.C.

(57) ABSTRACT

A power supply management circuit includes a first contact receiving a transmitted voltage, a second contact outputting the transmitted voltage, a relay coupled between the first contact and the second contact, a discharge unit coupled to the relay in parallel, and an activation unit coupled to the discharge unit. When the power supply management circuit receives a control signal, the discharge unit is turned on or off, and the relay enters into a switching procedure. When the control signal is an ON signal, the activation unit generates a driving voltage to turn on the discharge unit, the relay enters into a turn-on procedure, and the transmitted voltage is transmitted to the second contact through the discharge unit; after the switching procedure is completed, the activation unit stops generating the driving voltage to turn off the discharge unit, and the transmitted voltage is transmitted to the second contact through the relay.

13 Claims, 7 Drawing Sheets

(56) References Cited

FOREIGN PATENT DOCUMENTS

| | | |
|---|---|---|
| CN | 203859527 U | 10/2014 |
| CN | 106300649 A | 1/2017 |
| CN | 205945225 U | 2/2017 |
| CN | 107863954 | 3/2018 |
| CN | 107958811 | 4/2018 |
| CN | 208707928 | 4/2019 |
| CN | 110349793 A | 10/2019 |
| CN | 209843912 | 12/2019 |
| CN | 114070030 A | 2/2022 |
| CN | 216625372 U | 5/2022 |
| CN | 217769488 | 11/2022 |
| WO | 2016/046814 A2 | 3/2016 |

\* cited by examiner

POWER SUPPLY MANAGEMENT CIRCUIT AND POWER SUPPLY USING THE SAME

CROSS-REFERENCE TO RELATED APPLICATION

This non-provisional application claims priority under 35 U.S.C. § 119(a) to Patent Application No. 112118994 filed in Taiwan, R.O.C. on May 22, 2023, the entire contents of which are hereby incorporated by reference.

BACKGROUND

Technical Field

The instant disclosure is related to a power supply management circuit, especially a power supply management circuit which couples a discharge unit to a relay in parallel.

Related Art

An automatic transfer switch (ATS) is a device for automatically switching a power source. The main function of the ATS is to select one of a plurality of available independent input power sources automatically, so as to avoid power outage due to the failure of a single power source. When a main power source is abnormal (such as when there is outage, undervoltage, overvoltage or voltage drop), a digital signal processor (DSP) can detect the abnormality of the power source and switches to using the backup power source. After the main power source is restored to normal, the DSP can further automatically switches back to using the main power source, so that a system with the ATS may still ensure the stability of its operation when the system faces a power system with factors of instability.

In order to resolve potential issues (such as switching delay (such as up to 10 ms), arc, spark, jumping, high temperature, or sticking) of existing ATSs using relays as switching devices, currently adopted solutions often utilize semiconductor switches (such as MOSFETs) to replace or assist the relays as the switching devices. Compared with the relay, the MOSFET does not have delay time and jumping caused by the mechanical operation in practical use and can complete a switching within a few milliseconds, and therefore the time for switching to using another power source may be greatly reduced, and the stability of power feeding of the power supply can be increased. However, such an ATS that uses semiconductor devices as main switches thereof has potential safety issues. For example, safety code UL62368 states that all ATSs must comply with regulations regarding insulation distance of UL1008. Compared with a relay switch, a semiconductor switch such as an MOSFET, an IGBT, or an SCR which is commonly seen does not realize switching through actual spatial insulation but rather by controlling the conduction of the channel thereof. As a result, a semiconductor cannot conform to regulations of creepage and clearance in the safety code, and therefore needs to additionally pass tests such as high potential (hi-pot) test and thermal cycling test.

SUMMARY

In view of the above issues, the instant disclosure provides a power supply management circuit and a power supply using such power supply management circuit. In one or some embodiments, when the power supply management circuit performs switching, the power supply management circuit first turns on a discharge unit (within a few milliseconds) so as to substantially short the main contacts of a relay until the relay completes action, and then turns off the discharge unit. As a result, the switching delay caused by the mechanical operation of the relay can be eliminated, and therefore the power supply management circuit has the ability to switch power sources quickly. Consequently, power feeding of the power supply can be completed once again within a holdup time, and therefore the requirement for a capacity of a later stage storage capacitor can be reduced. Besides, the power supply management circuit according to one or some embodiments of the instant disclosure allows the relay to substantially perform soft switching, so that the reduction of the relay's service life caused by the arc generated by jumping can be avoided. Consequently, the power supply management circuit according to one or some embodiments of the instant disclosure can replace existing ATS's methods of switching and power management and thus increase the stability of power supply.

In some embodiments, the power supply management circuit comprises a first contact, a second contact, a relay, a discharge unit, and an activation unit. The first contact is configured to receive a transmitted voltage. The second contact is configured to output the transmitted voltage. The relay is coupled between the first contact and the second contact. The discharge unit is coupled between the first contact and the second contact, and the discharge unit is coupled to the relay in parallel. The activation unit is coupled to the discharge unit. In response to that the power supply management circuit receives a control signal, the discharge unit is turned on or off, and the relay enters into a switching procedure; wherein the switching procedure comprises a turn-on procedure and a turn-off procedure. In response to that the control signal is an ON signal, the activation unit generates a driving voltage to turn on the discharge unit, the relay enters into the turn-on procedure, and the transmitted voltage is transmitted to the second contact through the discharge unit; after the switching procedure is completed, the activation unit stops generating the driving voltage to turn off the discharge unit, and the transmitted voltage is transmitted to the second contact through the relay.

In some embodiments, a power supply comprises a first power supply path, a second power supply path, and a power conversion unit. The first power supply path is coupled to a first power source, and the first power supply path comprises a first live wire and a first neutral wire. The second power supply path is coupled to a second power source, and the second power supply path comprises a second live wire and a second neutral wire. Each of the first live wire, the first neutral wire, the second live wire, and the second neutral wire comprises the foregoing power supply management circuit. The second live wire is coupled to the first live wire, and a live wire contact is at a coupling point between the second live wire and the first live wire. The second neutral wire is coupled to the first neutral wire, and a neutral wire contact is at a coupling point between the second neutral wire and the first neutral wire. The power conversion unit is coupled to the live wire contact and the neutral wire contact.

As above, the power supply management circuit and the power supply provided by one or some embodiments of the instant disclosure take the discharge unit as an auxiliary switch which is fast-acting and has high-voltage, large-current switching capability. Compared with the channel of a semiconductor switching device, the discharge unit can withstand larger pulsed currents and has higher endurance for avalanche so as to overcome issues related to using a semiconductor switch as the auxiliary switch for the relay. As such, the power supply management circuit of one or some embodiments of the instant disclosure has the ability to quickly switch power sources and therefore reduces the requirement for the capacity of the later stage storage capacitor, and the service life of the contacts of the relay can be prolonged.

BRIEF DESCRIPTION OF THE DRAWINGS

The instant disclosure will become more fully understood from the detailed description given herein below for illustration only, and therefore not limitative of the instant disclosure, wherein.

DETAILED DESCRIPTION

Figure 1:
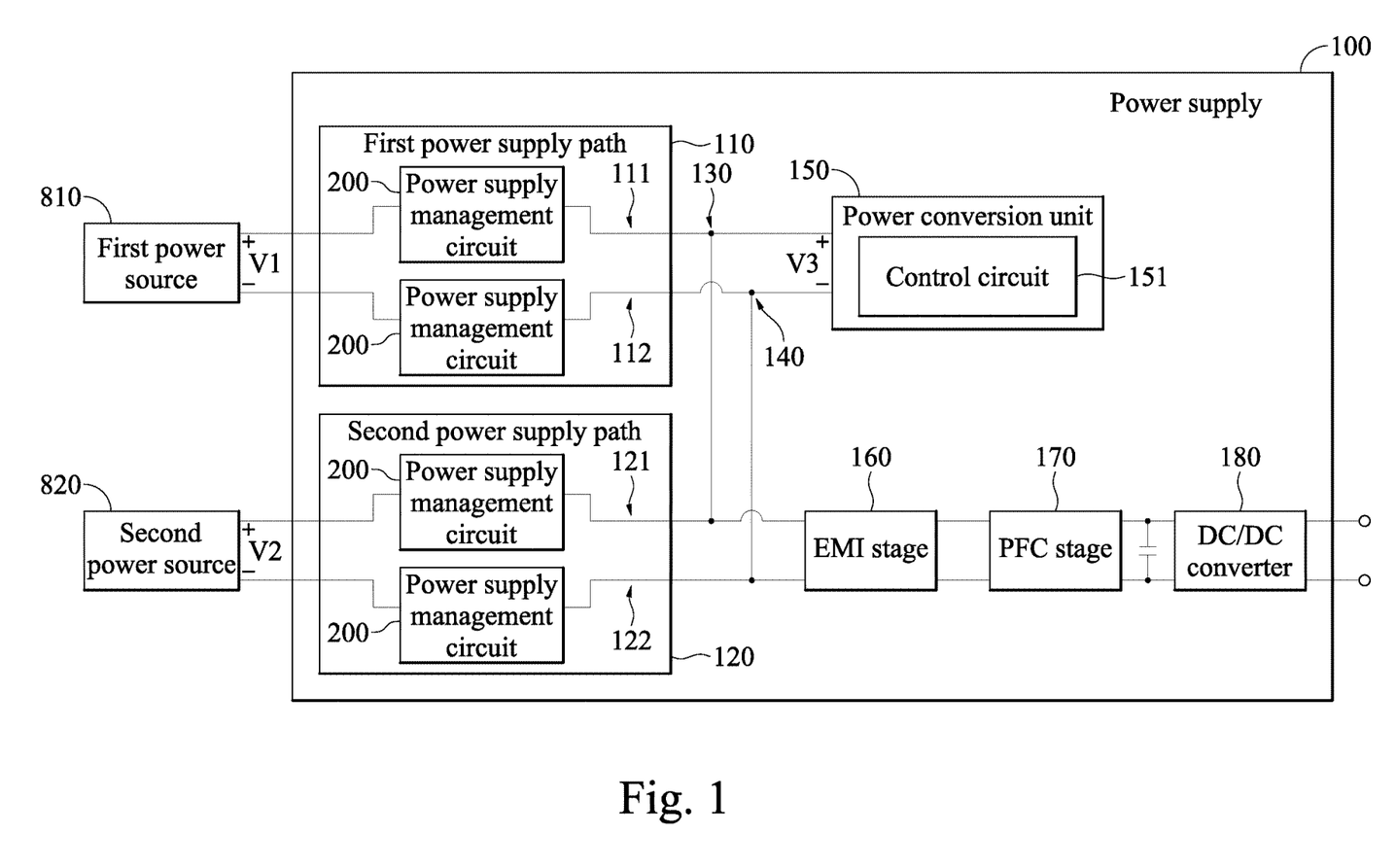
FIG. 1 illustrates a schematic block diagram of a power supply connected to a first power source and a second power source according to some embodiments of the instant disclosure.

Please refer to FIG. 1. A power supply 100 according to some embodiments of the instant disclosure comprises a first power supply path 110, a second power supply path 120, and a power conversion unit 150. The power supply 100 may receive power feeding from two independent power sources. Furthermore, the power supply 100 can overcome not only issues of existing power supplies using relays (switching delay (such as up to 10 ms) of relays, arc, spark, jumping, high temperature, or sticking etc.), but also issues of power supplies using semiconductor switches to replace or assist the relays (such as limitations on insulation) (illustrated later). In the embodiment shown in FIG. 1, because the power supply 100 is connected to two power sources (such as a first power source 810 and a second power source 820), the power supply 100 comprises two power supply paths (i.e., the first power supply path 110 and the second power supply path 120). However, the number of the power supply paths may be further increased according to practical requirements and therefore is not limited in the instant disclosure. For example, in practical application, if the power supply 100 is connected to more than two power sources, the power supply 100 may further comprise a third power supply path, a fourth power supply path, and so on.

The first power supply path 110 is coupled to the first power source 810 and comprises a first live wire 111 and a first neutral wire 112. The second power supply path 120 is coupled to the second power source 820 and comprises a second live wire 121 and a second neutral wire 122. When the first power supply path 110 is conducting, the first power supply path 110 transmits a first power source voltage V1 provided by the first power source 810 to later stages (for example, but not limited to, an EMI stage 160, a PFC stage 170, and a DC/DC converter 180). When the second power supply path 120 is conducting, the second power supply path 120 transmits a second power source voltage V2 provided by the second power source 820 to the later stages, and thus can replace the first power source voltage V1 from the first power source 810 if necessary. For example, if the first power source 810 is the main power source and the second power source 820 is the backup power source, when the first power source 810 is abnormal (such as when there is outage, undervoltage, overvoltage, or voltage drop), the power supply 100 cuts off the first power supply path 110 and conducts the second power supply path 120, so that the second power source voltage V2 from the second power source 820 replaces the first power source voltage V1 from the first power source 810.

Specifically, in some embodiments, the architecture that allows the power supply 100 to switch between the first power supply path 110 and the second power supply path 120 is as follows: each of the first live wire 111, the first neutral wire 112, the second live wire 121, and the second neutral wire 122 is connected to a corresponding one of power supply circuits 200; the second live wire 121 is coupled to the first live wire 111, and a live wire contact 130 is at a coupling point between the second live wire 121 and the first live wire 111; the second neutral wire 122 is coupled to the first neutral wire 112, and a neutral wire contact 140 is at a coupling point between the second neutral wire 122 and the first neutral wire 112; and the power conversion unit 150 is coupled to the live wire contact 130 and the neutral wire contact 140. With such architecture, an input voltage V3 of the power conversion unit 150 can be used to determine whether the first power source voltage V1 from the first power source 810 is abnormal (such as by using a phase-frequency detector to detect power source abnormality), and the aforementioned switching can be performed when the first power source voltage V1 becomes abnormal and when the first power source voltage V1 restores to normal (illustrated later).

The power conversion unit 150 comprises a control circuit 151. The control unit 151 may be implemented using a digital signal processor (DSP), but the instant disclosure is not limited thereto. The control circuit 151 is configured to detect power supply states of the first power source 810 and the second power source 820. When the first power source 810 stops supplying power or malfunctions, the control circuit 151 provides an OFF signal for the power supply management circuit 200 of the first live wire 111 and the power supply management circuit 200 of the first neutral wire 112 so as to actuate a relay 230 (as shown in FIG. 2) of the first live wire 111 and a relay 230 (as shown in FIG. 2) of the first neutral wire 112 to cut off a connection between the first power source 810 and the power conversion unit 150, and the control circuit 151 also provides an ON signal for the power supply management circuit 200 of the second live wire 121 and the power supply management circuit 200 of the second neutral wire 122 so as to actuate a relay 230 of the second live wire 121 and a relay 230 of the second neutral wire 122 to establish a connection between the second power source 820 and the power conversion unit 150.

Figure 2:
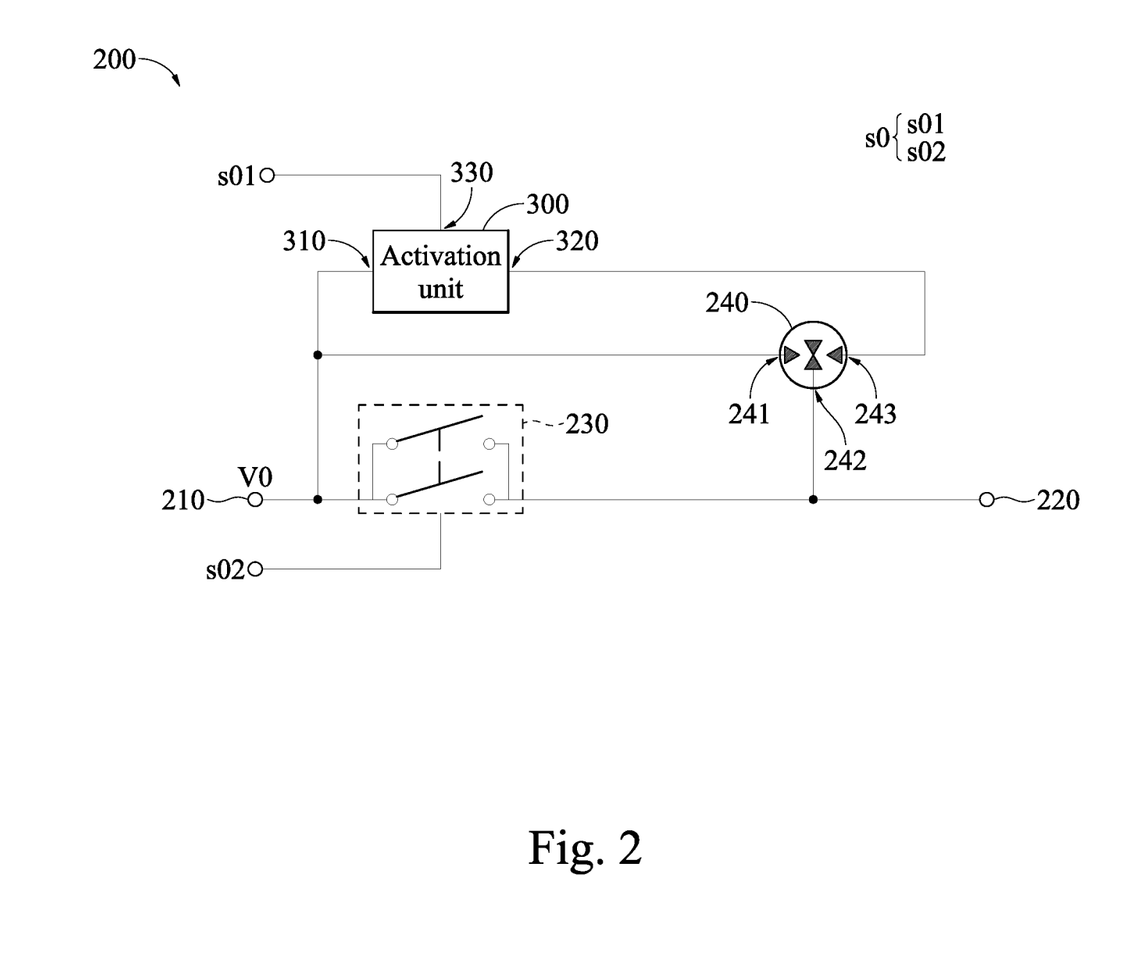
FIG. 2 illustrates a schematic block diagram of a power supply management circuit according to an exemplary embodiment of the instant disclosure.

Please refer to FIG. 2. The power supply management circuit 200 comprises a first contact 210, a second contact 220, a relay 230, a discharge unit 240, and an activation unit 300. The first contact 210 is configured to receive a transmitted voltage V0. The second contact 220 is configured to output the transmitted voltage V0. The power supply management circuit 200 is used to control whether the path between the first contact 210 and the second contact 220 is conducted, so as to transmit the transmitted voltage V0 from the first contact 210 to the second contact 220 during conduction.

The relay 230 is coupled between the first contact 210 and the second contact 220. When the relay 230 is turned on, the transmitted voltage V0 is transmitted to the second contact 220 through the relay 230. In some embodiments, although the illustration is performed using a single relay 230, but the instant disclosure is not limited thereto. In some other embodiments, the illustration may also be performed using a plurality of relays 230 connected to each other in parallel and/or in series, so as to prevent the issue where the relay 230 cannot be turned off caused by sticking and/or the issue where the relay 230 cannot be turned on caused by jumping.

The discharge unit 240 is coupled between the first contact 210 and the second contact 220, and the discharge unit 240 is coupled to the relay 230 in parallel. The activation unit 300 is coupled to the discharge unit 240. When the discharge unit 240 is turned on, the transmitted voltage V0 is transmitted to the second contact 220 through the discharge unit 240. With such arrangement, in order to reduce the stress on the relay 230 when the relay 230 switches, the discharge unit 240 can serve as an auxiliary switch and be turned on before the relay 230 switches. Specifically, in some embodiments, before the relay 230 is switched, the discharge unit 240 is first driven, so that the current of the load can be transferred to the discharge unit 240 during the process of contact switching of the relay 230, and so that the voltage across the relay 230 when the relay 230 is switching is merely the voltage across the discharge unit 240 during arc discharge (according to the characteristics of the discharge unit 240) (illustrated later). Here, the on-time of the discharge unit 240 is usually the switching time of the relay 230 which is known when designing this system, so that the stress which the contact of the relay withstands during switching can be further eliminated. Therefore, soft switching of the relay 230 is achieved, and thus advantages of prolonged service life of the relay 230 and avoiding sticking of the contact of the relay 230 can be achieved. In some embodiments, the discharge unit 240 is implemented using a gas discharge tube. In some embodiments, through that the activation unit 300 drives the discharge unit 240, the discharge unit 240 is maintained at the state of arc discharge and turned on (illustrated later), so that the transmitted voltage V0 can be transmitted to the second contact 220 through the discharge unit 240.

In some embodiments, the discharge unit 240 is constituted by a 3-terminal gas discharge tube, and the discharge unit 240 realizes a function similar to switching through gas discharge principle. The structure of a gas discharge tube is similar to that of a triggered spark gap. The gas discharge tube is a switch based on gas discharge principle and high-voltage driving, and the principles of turning on and turning off of the gas discharge tube is different from those of a mechanical switch and those of a semiconductor switch. The gas discharge tube has the advantages of the mechanical switch: spatial insulation exists between the contacts thus can satisfy the requirement for spatial distance of ATS safety codes, but the gas discharge tube does not have the disadvantages of delay and jumping caused by mechanical operation. Furthermore, the gas discharge tube has the advantage of fast switching thus can satisfy the requirement for creepage of ATS safety codes, but the gas discharge tube does not have the disadvantage of insufficient spatial insulation of the semiconductor switch. In one or some embodiments of the instant disclosure, the discharge unit 240 is used as the auxiliary switch for the relay 230, so that the power supply management circuit 200 is equipped with the ability to quickly switch power sources and equipped with extremely high instantaneous load-withstanding capacity.

Specifically, in some embodiments, the discharge unit 240 comprises a first end 241, a second end 242, and a third end 243, and the relay 230 is coupled to the first end 241 and the second end 242 of the discharge unit 240 in parallel. In some embodiments, the activation unit 300 comprises a driving end 330, a first output end 310, and a second output end 320. The first output end 310 and the second output end 320 are coupled to the first end 241 and the third end 243 of the discharge unit 240, respectively. The activation unit 300 receives a control signal s0 (specifically, a first control signal s01, illustrated later) through the driving end 330 so as to drive the discharge unit 240 to be turned on or turned off.

Figure 3:
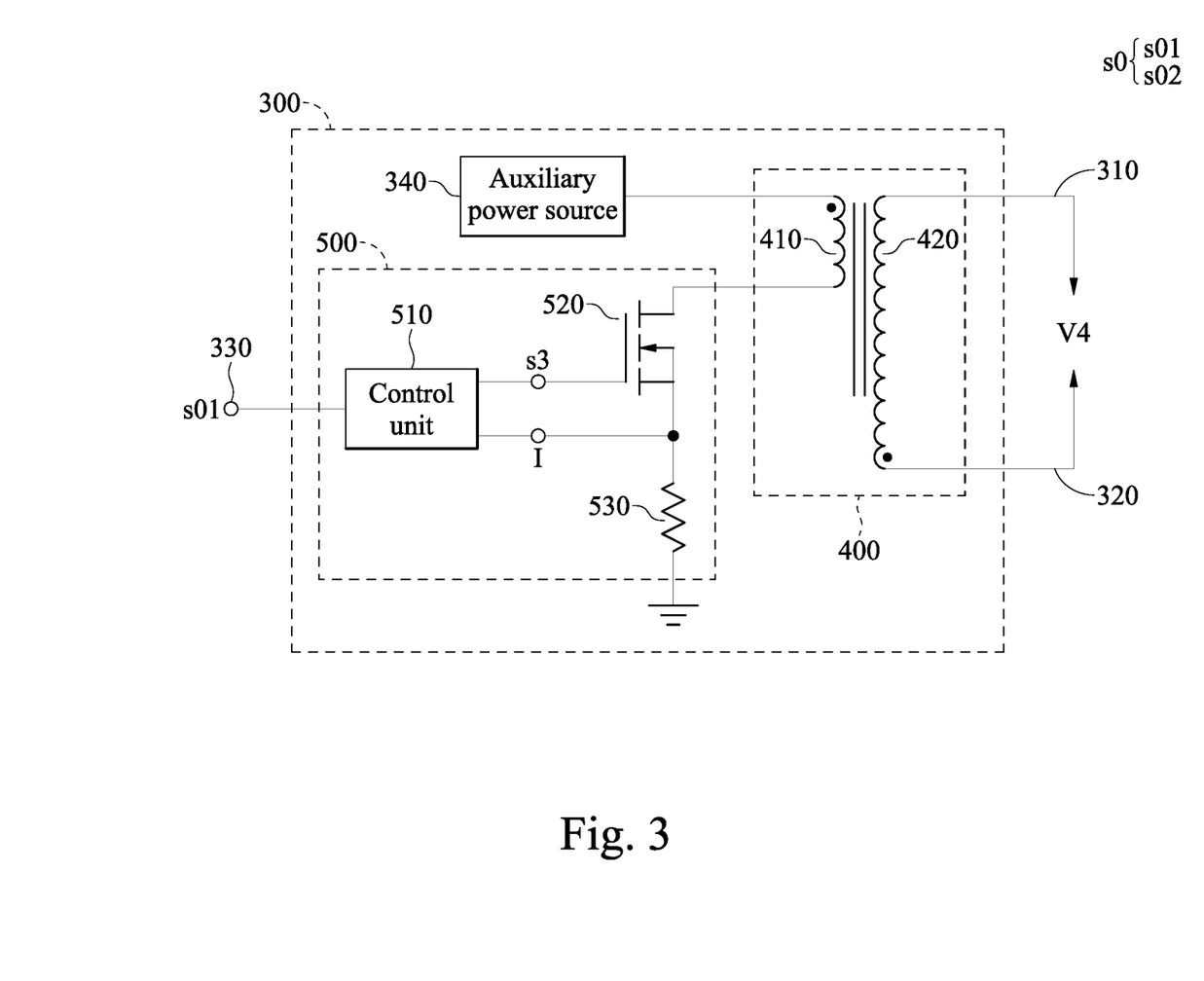
FIG. 3 illustrates a schematic diagram of an activation unit according to a first embodiment of the instant disclosure.

Please refer to FIG. 3. In some embodiments, the activation unit 300 further comprises a transformer 400 and a driving module 500. The transformer 400 comprises a primary side winding 410 and a secondary side winding 420. The driving module 500 is coupled to the primary side winding 410 and comprises a control unit 510, a switch 520, and a current feedback circuit 530. The control unit 510 is configured to receive the control signal s0 (specifically, the first control signal s01, illustrated later) and transmit a driving signal s3 according to the control signal s0. The switch 520 is coupled to the control unit 510 and the primary side winding 410 of the transformer 400, and the switch 520 is configured to be turned on or turned off according to the driving signal s3. The current feedback circuit 530 is coupled to the switch 520 and the control unit 510, and the current feedback circuit 530 is configured to detect a current traveling through the switch 520 and feed a current sensing signal I back to the control unit 510. The transformer 400 generates a driving voltage V4 through the secondary side winding 420 according to a switching operation of the switch 520. An auxiliary power source 340 of the activation unit 300 may be implemented using an internal power source of the ATS or other ways. After the control unit 510 received the control signal s0, the control unit 510 drives the switch 520 with a fixed frequency and performs peak current control through the voltage of the current feedback circuit 530 with current feedback function.

The architecture of the activation unit 300 of FIG. 3 adopts the circuit architecture of a boost flyback converter, but the application and the control method of the activation unit 300 of FIG. 3 are different from those of an existing flyback converter. The existing flyback converter is usually applied to fix the voltage output, and the stability of the output voltage is maintained with a feedback control method. However, in the activation unit 300, the application goal of the flyback converter is to generate a high-voltage power source (the driving voltage V4) at the secondary side winding 420 of the transformer 400 and to limit the current traveling through the discharge unit 240. The high-voltage power source is generated through the transformer 400 with a high turn ratio, and the current traveling through the discharge unit 240 is limited with the peak current control method after the discharge unit 240 is triggered. In this way, the voltage required for maintaining the arc discharge between the electrodes (between the first end 421 and the second end 242) of the discharge unit 240 is maintained. Accordingly, the architecture shown in FIG. 3 is a control method and an application with high-voltage triggering, low-voltage maintaining, and current-limiting protection.

Figure 5:
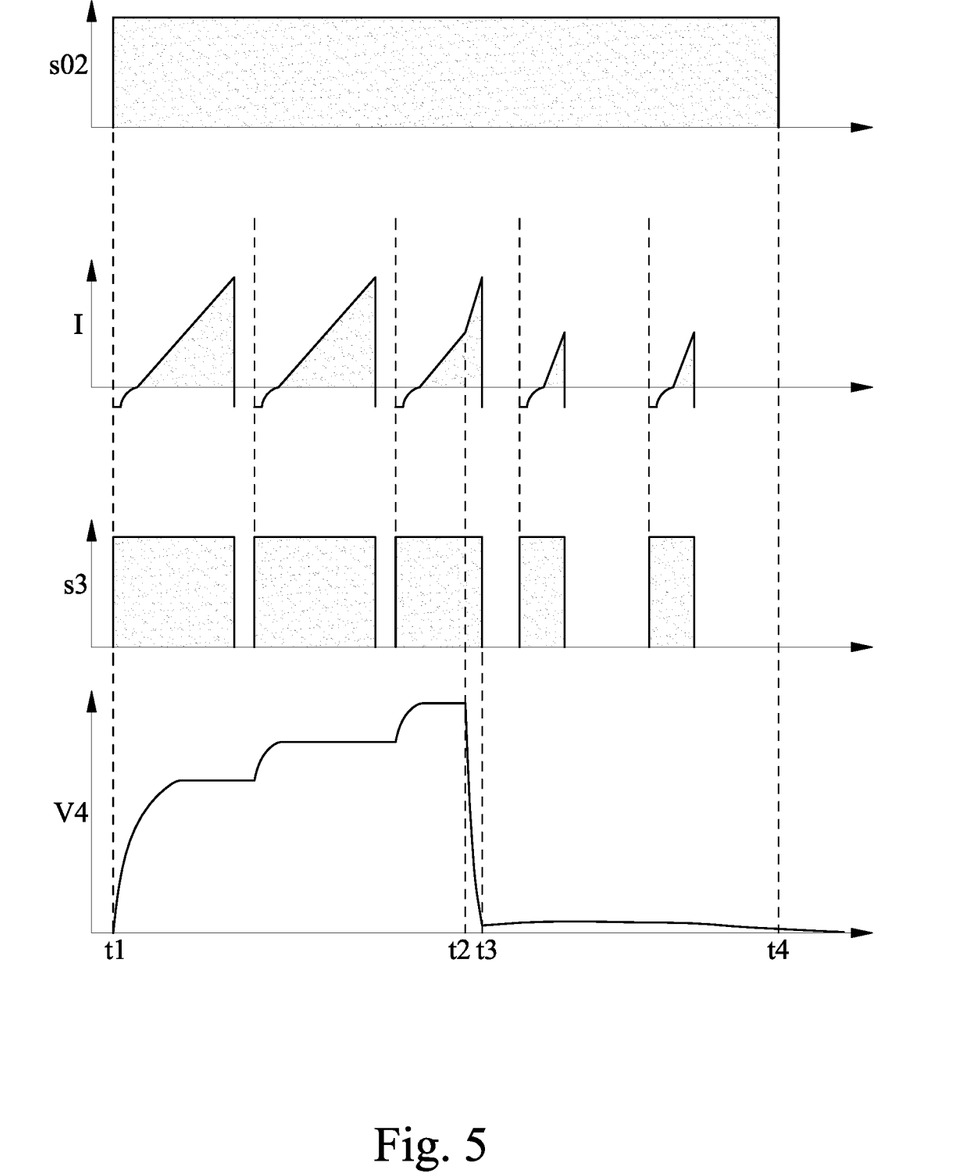
FIG. 5 illustrates a waveform sequence diagram of some signals of an exemplary operation of the activation unit according to an exemplary embodiment of the instant disclosure.

Before the activation unit 300 triggers the discharge unit 240, because the discharge unit 240 is not yet turned on, a state of the secondary side of the flyback converter (i.e., in this embodiment, the first output end 310 and the second output end 320, which are coupled to the secondary side winding 420) is equivalent to an open circuit with no load. During this time, an excitation current of the transformer 400 of the flyback converter exhibits increase and decrease with a slope of a standard no-load current, which are known when the flyback converter is designed, and the control unit 510 is set with a threshold value to limit the current peak value so as to protect the semiconductor switch (the switch 520) of the flyback converter. After the activation unit 300 completes the triggering of the discharge unit 240, because the discharge unit 240 is turned on, the voltage and an equivalent impedance between the electrodes at the secondary side of the activation unit 300 are equivalent to a circuit load when the discharge unit 240 is in the arc discharge state. During this time, the excitation current of the transformer 400 of the flyback converter exhibits increase and decrease with a slope of a non-standard load current. (as shown in FIG. 5, the slope of the current sensing signal I is different before and after a time t2). Besides, after the control unit 510 determines that the discharge unit 240 is completely triggered, the control unit 510 further limits the value of the peak current to the aforementioned threshold value. In order to limit the threshold of the peak current, the control unit 510 reduces an amplitude of the excitation current and an energy transmitted to the secondary side winding 420 while the discharge unit 240 is still maintained at the arc discharge state. As a result, a power consumption is reduced when the discharge unit 240 is maintained at the arc discharge state.

Figure 4:
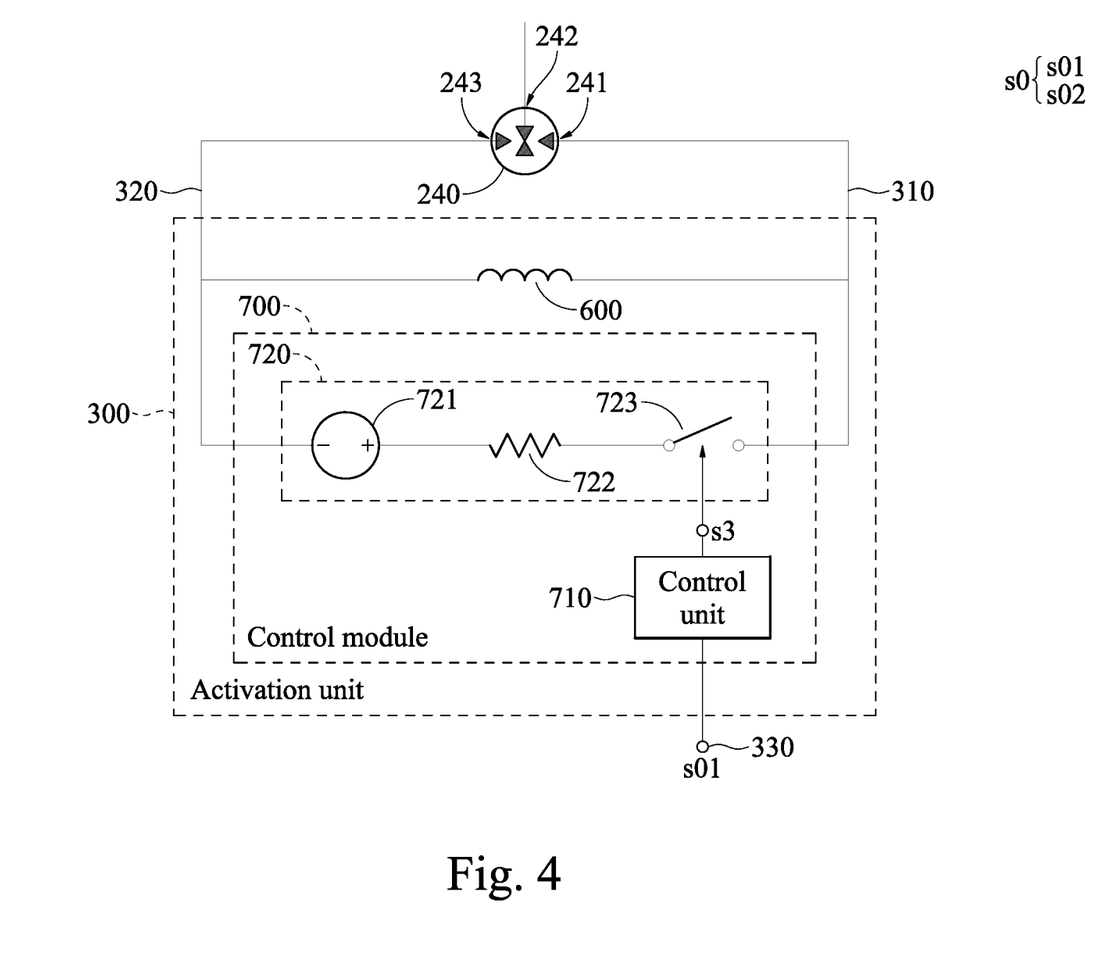
FIG. 4 illustrates a schematic diagram of an activation unit according to a second embodiment of the instant disclosure.

Please refer to FIG. 4. Another implementation of the activation unit 300 comprises a winding 600 and a driving module 700. The winding 600 is coupled to the first end 241 and the third end 243 of the discharge unit 240 in parallel. The driving module 700 comprises a control unit 710 and a control module 720. The control unit 710 is configured to receive the control signal s0 (specifically, the first control signal s01, illustrated later) and transmit a driving signal s3 according to the control signal s0. The control module 720 comprises an independent power source 721, a sensing unit 722, and a switch 723. The independent power source 721 is coupled to the sensing unit 722 in series. The sensing unit 722 is coupled to the switch 723 in series. The switch 723 is coupled to the control unit 710. The control module 720 is coupled to the first end 241 and the third end 243 of the discharge unit 240 in parallel. The switch 723 is configured to be turned on or turned off according to the driving signal s3. The winding 600 generates the driving voltage V4 according to a switching operation of the switch 723. Accordingly, the architecture shown in FIG. 4 is also able to achieve the aforementioned effect of reducing the power consumption of the discharge unit 240 when the discharge unit 240 is maintained at the arc discharge state, while the effect of the discharge unit 240 is still maintained at the of arc discharge state.

Please refer to FIG. 3 and FIG. 5 at the same time. The turn-on process of the gas discharge tube (the discharge unit 240) is described as below. At time t1, the activation unit 300 starts to establish a high voltage across the first end 241 and the second end 242 of the discharge unit 240 through the switching of the switch 520/723, so that ionization of the gas inside the discharge unit 240 occurs. When the voltage exceeds a breakdown voltage of the discharge unit 240 (at a time t2), arc discharge is generated between the first end 241 and the second end 242. During this time, because the discharge effect of the gas inside the discharge unit 240, the first end 241, the second end 242, and the third end 243 exhibit a turned-on state, and the arc discharge state is maintained by the activation unit 300. Therefore, the discharge unit 240 is equivalent to a controllable switch. Because the voltage during the arc discharge state is lower (such as from time t3 to time t4), after the discharge unit 240 is turned on, the control unit 510/710 lowers an output duty cycle of the driving signal s3 of the control unit 510/710 under the condition of allowing the discharge unit 240 to be maintained turned on, so as to lower the driving voltage V4 and lower the power output. When the discharge unit 240 should be turned off (such as at time t4), a second control signal s02 (included in the control signal s0, illustrated later) no longer actuates the control unit 510/710 to drive the switch 520/723, so as to turn off the discharge unit 240.

Please refer to FIG. 1 and FIG. 2. When the power supply management circuit 200 receives the control signal s0, the discharge unit 240 is turned on or turned off, and the relay 230 enters into a switching procedure. The switching procedure comprises a turn-on procedure and a turn-off procedure; i.e., the relay 230 will also be turned on or turned off. Because the discharge unit 240 is implemented using elements such as the gas discharge tube, the time required for the switching (i.e., the turning on or the turning off) of the discharge unit 240 is less than the time required for the switching procedure of the relay 230. As a result, the turning-on or the turning-off of the discharge unit 240 will be completed earlier than the switching procedure of the relay 230.

For example, when the control signal s0 is an ON signal (i.e., when the power supply management circuit 200 needs to be conducted), the activation unit 300 generates the driving voltage V4 so that the discharge unit 240 is turned on, and the relay 230 enters into the turn-on procedure. At this time, because the discharge unit 240 is first turned on, the transmitted voltage V0 is transmitted to the second contact 220 through the discharge unit 240. After the turn-on procedure of the relay 230 is completed, the activation unit 300 stops generating the driving voltage V4 so that the discharge unit 240 is turned off. At this time, the transmitted voltage V0 is transmitted to the second contact 220 through the relay 230.

Specifically, in some embodiments, the control signal s0 comprises the first control signal s01 and the second control signal s02. In response to that the control signal s0 is the ON signal, the first control signal s01 actuates the activation unit 300 to generate the driving voltage V4 to turn on the discharge unit 240, and the second control signal s02 actuates the relay 230 to enter into the turn-on procedure. During this time, the transmitted voltage V0 is transmitted to the second contact 220 through the discharge unit 240. After the turn-on procedure of the relay 230 is completed, the first control signal s01 disables the activation unit 300 from generating the driving voltage V4 to turn off the discharge unit 240. During this time, the transmitted voltage V0 is transmitted to the second contact 220 through the relay 230.

When the power supply management circuit 200 needs to be cut off, according to whether the power source connected to the power supply management circuit 200 is supplying power, the control signal s0 transmitted by the control circuit 151 will actuate the power supply management circuit 200 to perform different actions, illustrated below.

When the power supply management circuit 200 needs to be cut off (the control signal s0 is the OFF signal) and the power source connected to the power supply management circuit 200 is not supplying power, the specific switching operation is described as below. The first control signal s01 does not actuate the activation unit 300 to generate the driving voltage V4, and the second control signal s02 actuates the relay 230 to enter into the turn-off procedure. After the turn-off procedure of the relay 230 is completed, the electrical connection between the first contact 210 and the second contact 220 is cut off. In this application scenario, because the connected power source is not supplying power, the relay 230 does not need assistance from the auxiliary switch (i.e., the discharge unit 240) to avoid potential issues related to switching under high-voltage, large-current condition. Therefore, in this application scenario, the discharge unit 240 does not need to be turned on.

When the power supply management circuit 200 needs to be cut off (the control signal s0 is the OFF signal) and the power source connected to the power supply management circuit 200 is supplying power, the specific switching operation is described as below. The first control signal s01 actuates the activation unit 300 to generate the driving voltage V4 to turn on the discharge unit 240, and the second control signal s02 actuates the relay 230 to enter into the turn-off procedure. During this time, the transmitted voltage V0 is transmitted to the second contact 220 through the discharge unit 240. After the turn-off procedure of the relay 230 is completed, the first control signal s01 stops the activation unit 300 from generating the driving voltage V4 so that the discharge unit 240 is turned off. When the power supply management circuit 200 needs to be cut off and the power source connected to the power supply management circuit 200 is supplying power, it indicates that the user or the operator wants to temporarily or permanently stop using currently connected power source. Such scenarios include but are not limited to: (1) when an abnormality that is not outage (such as overvoltage, undervoltage or voltage drop) occurs to the connected power source; (2) when it is to switch to another power source (such as when the connected power source is a backup power source and the main power source has restored to normal power supply; or when it is to switch to another backup power source); or (3) when the connected power source needs to undergo maintenance or examination. During this time, the power supply 100 can select the auxiliary power source (such as the second power source 820) as the voltage input source for the later stages according to the setting of the power conversion unit 150.

Figure 6:
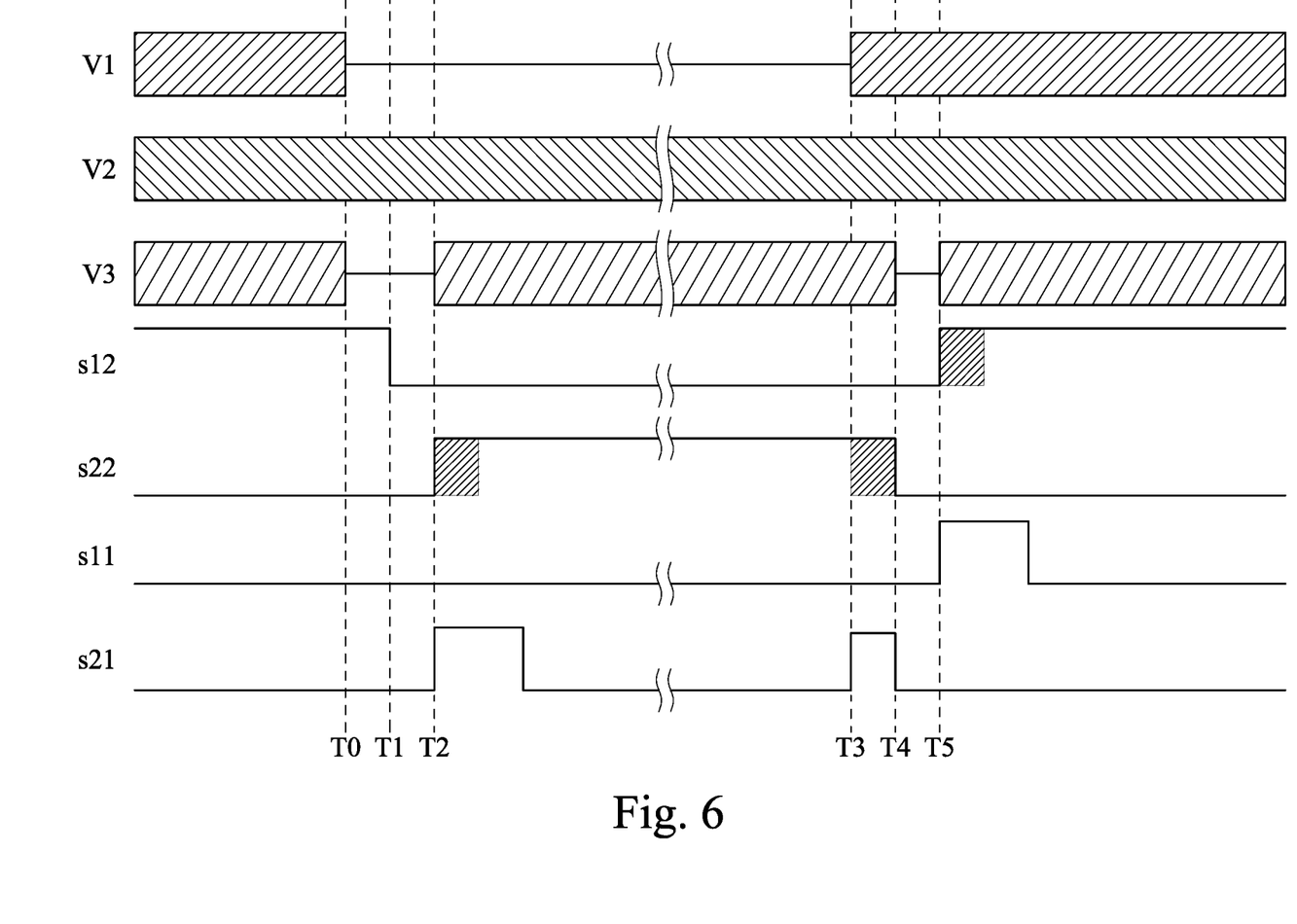
FIG. 6 illustrates a waveform sequence diagram of some signals of an exemplary operation (I) of the power supply according to an exemplary embodiment of the instant disclosure.

Please refer to FIG. 1, FIG. 2, and FIG. 6 at the same time. The following illustration takes the exemplary scenario of FIG. 6 for example. The first power source 810 stops supplying power at time T0, and therefore the first power source voltage V1 is dropped to 0. During this time, the control circuit 151 transmits the control signal s0 (a first control signal s11 of the first power supply path 110 and a second control signal s12 of the first power supply path 110) which indicates turning off to the power supply management circuit 200 of the first power supply path 110. Because the first power source voltage V1 has been dropped to 0 at the time T0, the first control signal s1i of the first power supply path 110 does not turn on the discharge units 240 of the first power supply path 110. The relays 230 of the first power supply path 110 enter into the turn-off procedure in response to the second control signal s12 of the first power supply path 110 which indicates turning off. At the time T1, the turn-off procedure of the relays 230 of the first power supply path 110 is completed.

At the time T2, the control circuit 151 transmits the control signal s0 (a first signal s21 of the second power supply path 120 and a second signal s22 of the second power supply path 120) which indicates turning on to the power supply management circuit 200 of the second power supply path 120. The first signal s21 of the second power supply path 120 turns on the discharge units 240 of the second power supply path 120. The relays 230 of the second power supply path 120 enter into the turn-on procedure in response to the second signal s22 of the second power supply path 120 which indicates turning on. A while after the turn-on procedure of the relays 230 of the second power supply path 120 is completed (such as after the conduction of the relays 230 becomes stable), the first signal s21 of the second power supply path 120 turns off the discharge units 240 of the second power supply path 120. As a result, the second power source voltage V2 is transmitted to the later stages through the second power supply path 120. In this way, the system has switched to using the second power source 820 for power supply.

At the time T3, the first power source 810 has restored to normal power supply, and therefore the control circuit 151 transmits the control signal s0 which indicates turning off to the power supply management circuit 200 of the second power supply path 120. The first signal s21 of the second power supply path 120 turns on the discharge units 240 of the second power supply path 120. The relays 230 of the second power supply path 120 enter into the turn-off procedure in response to the second signal s22 of the second power supply path 120 which indicates turning off. After the turn-off procedure of the relays 230 of the second power supply path 120 is completed at the time T4, the first signal s21 of the second power supply path 120 turns off the discharge units 240 of the second power supply path 120 at the same time.

At the time T5, the control circuit 151 transmits the control signal s0 which indicates turning on to the power supply management circuit 200 of the first power supply path 110. The first control signal s11 of the first power supply path 110 turns on the discharge units 240 of the first power supply path 110. The relays 230 of the first power supply path 110 enter into the turn-on procedure in response to the second control signal s12 of the first power supply path 110 which indicates turning on. A while after the turn-on procedure of the relays 230 of the first power supply path 110 is completed (such as after the conduction of the relays 230 becomes stable), the first control signal s1i of the first power supply path 110 turns off the discharge units 240 of the first power supply path 110. As a result, the first power source voltage V1 is transmitted to the later stages through the first power supply path 110. In this way, the system has switched to using the first power source 810 for power supply.

Figure 7:
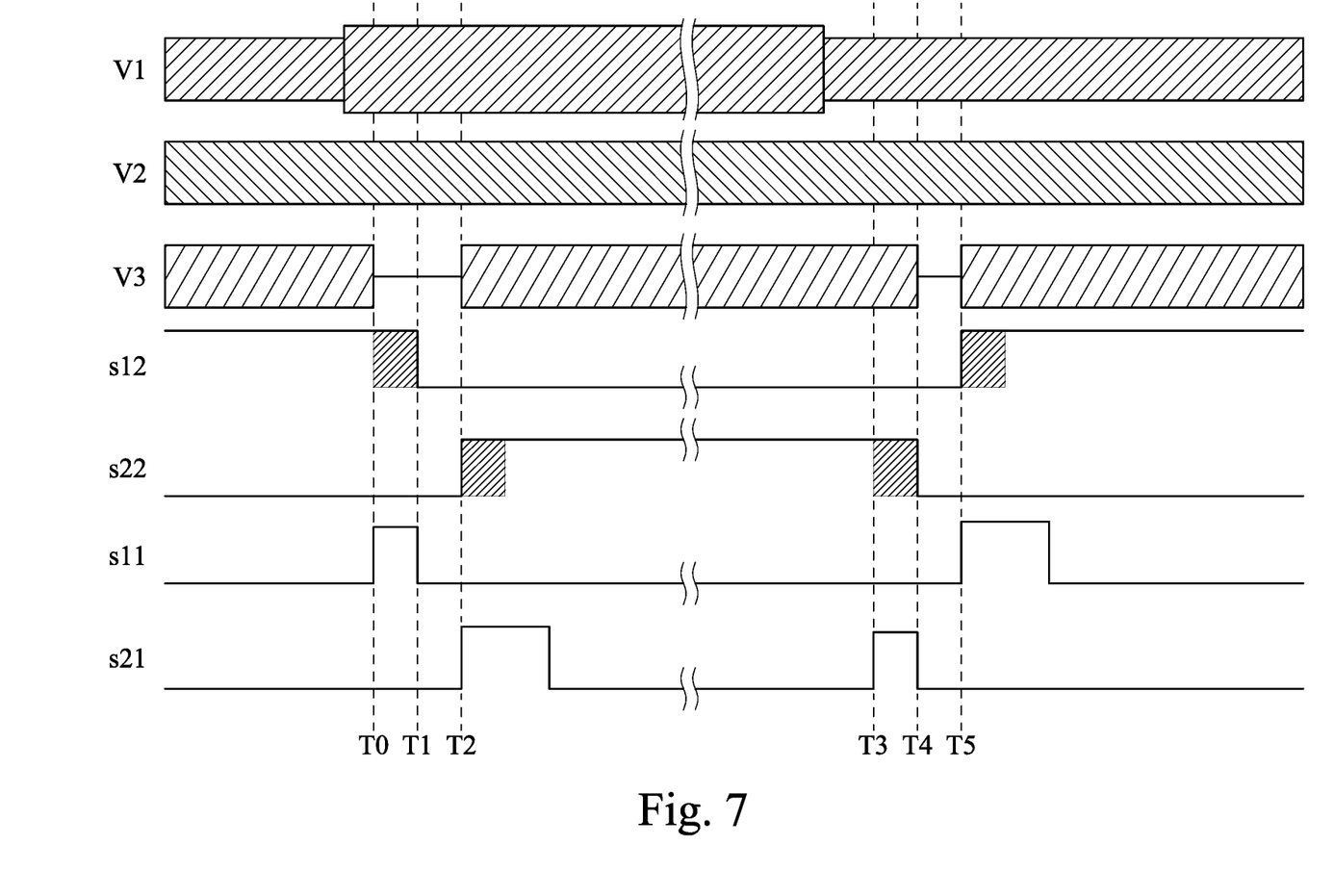
FIG. 7 illustrates a waveform sequence diagram of some signals of an exemplary operation (II) of the power supply according to an exemplary embodiment of the instant disclosure.

Please refer to FIG. 1, FIG. 2, and FIG. 7 at the same time. The difference between the exemplary scenario of FIG. 7 and the exemplary scenario of FIG. 6 is that the first power source 810 does not stop supplying power; instead, in the exemplary scenario of FIG. 7, an aforementioned situation in which it is to temporarily or permanently stop using currently connected power source occurs. As a result, in this exemplary scenario, the difference of control for the power supply management circuit 200 only exists during the period from the time T0 to the time T1. At the time T0, the control circuit 151 transmits the control signal s0 which indicates turning off to the power supply management circuit 200 of the first power supply path 110. The first control signal s11 of the first power supply path 110 turns on the discharge units 240 of the first power supply path 110. The relays 230 of the first power supply path 110 enter into the turn-off procedure in response to the second control signal s12 of the first power supply path 110 which indicates turning off. After the turn-off procedure of the relays 230 of the first power supply path 110 is completed (at the time T1), the first control signal s11 of the first power supply path 110 turns off the discharge units 240 of the first power supply path 110. As a result, the first power source voltage V1 is no longer transmitted to the later stages through the first power supply path 110. It is noted that, the control manners of the exemplary scenario of FIG. 7 during the subsequent times are identical to those of the exemplary scenario of FIG. 6. Therefore, in the exemplary scenario of FIG. 7, the second power source 820 is used for power supply within a certain period of time, and then the first power source 810 is subsequently restored to being used for power supply.

As above, the power supply management circuit and the power supply provided by one or some embodiments of the instant disclosure take the discharge unit as an auxiliary switch which is fast-acting and has high-voltage, large-current switching capability. Compared with the channel of a semiconductor switching device, the discharge unit can withstand larger pulsed currents and has higher endurance for avalanche so as to overcome issues related to using a semiconductor switch as the auxiliary switch for the relay. As such, the power supply management circuit of one or some embodiments of the instant disclosure has the ability to quickly switch power sources and therefore reduces the requirement for the capacity of the later stage storage capacitor, and the service life of the contacts of the relay can be prolonged.

What is claimed is:

1. A power supply management circuit comprising:
   a first contact configured to receive a transmitted voltage;
   a second contact configured to output the transmitted voltage;
   a relay coupled between the first contact and the second contact;
   a discharge unit coupled between the first contact and the second contact, wherein the discharge unit comprises a first end, a second end, and a third end, and the relay is coupled to the first end and the second end of the discharge unit in parallel; and
   an activation unit coupled to the discharge unit; wherein
   in response to that the power supply management circuit receives a control signal, the discharge unit is turned on or off, and the relay enters into a switching procedure, wherein the switching procedure comprises a turn-on procedure and a turn-off procedure; and
   in response to that the control signal is an ON signal, the activation unit generates a driving voltage to turn on the discharge unit, the relay enters into the turn-on procedure, and the transmitted voltage is transmitted to the second contact through the discharge unit; after the switching procedure is completed, the activation unit stops generating the driving voltage to turn off the discharge unit, and the transmitted voltage is transmitted to the second contact through the relay.

2. The power supply management circuit according to claim 1, wherein the control signal comprises a first control signal and a second control signal; in response to that the control signal is the ON signal, the first control signal actuates the activation unit to generate the driving voltage to turn on the discharge unit, the second control signal actuates the relay to enter into the turn-on procedure, and the transmitted voltage is transmitted to the second contact through the discharge unit; after the turn-on procedure is completed, the first control signal disables the activation unit from generating the driving voltage to turn off the discharge unit, and the transmitted voltage is transmitted to the second contact through the relay.

3. The power supply management circuit according to claim 1, wherein the control signal comprises a first control signal and a second control signal; in response to that the control signal is an OFF signal, the first control signal actuates the activation unit to generate the driving voltage to turn on the discharge unit, and the second control signal actuates the relay to enter into the turn-off procedure; after the turn-off procedure is completed, the first control signal disables the activation unit from generating the driving voltage to turn off the discharge unit.

4. The power supply management circuit according to claim 1, wherein the control signal comprises a first control signal and a second control signal; in response to that the control signal is an OFF signal, the first control signal does not actuate the activation unit to generate the driving voltage, and the second control signal actuates the relay to enter into the turn-off procedure.

5. The power supply management circuit according to claim 1, wherein the activation unit comprises a driving end, a first output end, and a second output end, the first output end and the second output end are coupled to the first end and the third end of the discharge unit, respectively, and the activation unit receives the control signal through the driving end so as to drive the discharge unit to be turned on or turned off.

6. The power supply management circuit according to claim 5, wherein a time from the activation unit generating the driving voltage to the discharge unit being turned on or turned off is less than an execution time of the switching procedure of the relay.

7. The power supply management circuit according to claim 5, wherein the activation unit further comprises:
   a transformer comprising a primary side winding and a secondary side winding; and
   a driving module coupled to the primary side winding, wherein the driving module comprises:
      a control unit configured to receive the control signal and transmit a driving signal according to the control signal;
      a switch coupled to the control unit and the primary side winding of the transformer, wherein the switch is configured to be turned on or turned off according to the driving signal; and
      a current feedback circuit coupled to the switch and the control unit, wherein the current feedback circuit is configured to detect a current traveling through the switch and feedback a current sensing signal to the control unit;
   wherein the transformer generates the driving voltage through the secondary side winding according to a switching operation of the switch.

8. The power supply management circuit according to claim 7, wherein after the discharge unit is turned on, the control unit reduces an output duty cycle of the control unit under the condition of allowing the discharge unit to be maintained turned-on.

9. The power supply management circuit according to claim 5, wherein the activation unit further comprises:

a winding coupled to the first end and the third end of the discharge unit in parallel; and a driving module comprising:

a control unit configured to receive the control signal and transmit a driving signal according to the control signal; and a control module comprising an independent power source, a sensing unit, and a switch, wherein the independent power source is coupled to the sensing unit in series, the sensing unit is coupled to the switch in series, the switch is coupled to the control unit, the control module is coupled to the first end and the third end of the discharge unit in parallel, the switch is configured to be turned on or turned off according to the driving signal, and the winding generates the driving voltage according to a switching operation of the switch.

10. The power supply management circuit according to claim 9, wherein after the discharge unit is turned on, the control unit reduces an output duty cycle of the control unit under the condition of allowing the discharge unit to be maintained turned-on.

11. A power supply comprising:

a first power supply path coupled to a first power source, wherein the first power supply path comprises a first live wire and a first neutral wire;

a second power supply path coupled to a second power source, wherein the second power supply path comprises a second live wire and a second neutral wire, the second live wire is coupled to the first live wire, a live wire contact is at a coupling point between the second live wire and the first live wire, the second neutral wire is coupled to the first neutral wire, and a neutral wire contact is at a coupling point between the second neutral wire and the first neutral wire; and a power conversion unit coupled to the live wire contact and the neutral wire contact; wherein each of the first live wire, the first neutral wire, the second live wire, and the second neutral wire comprises the power supply management circuit according to claim 1.

12. A power supply according to claim 11, wherein the power conversion unit comprises a control circuit, the control circuit is configured to detect power supply states of the first power source and the second power source, when the first power source stops supplying power or malfunctions, the control circuit provides an OFF signal for the power supply management circuit of the first live wire and the power supply management circuit of the first neutral wire so as to actuate the relay of the first live wire and the relay of the first neutral wire to cut off a connection between the first power source and the power conversion unit, and the control circuit also provides the ON signal for the power supply management circuit of the second live wire and the power supply management circuit of the second neutral wire so as to actuate the relay of the second live wire and the relay of the second neutral wire to establish a connection between the second power source and the power conversion unit.

13. The power supply according to claim 12, wherein a time from the activation unit generating the driving voltage to the discharge unit being turned on or turned off is less than an execution time of the switching procedure of the relay.

* * * * *